(12) United States Patent
Hauke et al.

(10) Patent No.: US 10,146,282 B2
(45) Date of Patent: Dec. 4, 2018

(54) SYSTEM AND METHOD FOR MONITORING AND CONTROLLING A PERFORMANCE STATE CHANGE

(71) Applicant: ADVANCED MICRO DEVICES, INC., Sunnyvale, CA (US)

(72) Inventors: Jonathan Hauke, Lexington, MA (US); Benjamin Tsien, Fremont, CA (US); Denis Rystsov, San Francisco, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 255 days.

(21) Appl. No.: 14/528,431

(22) Filed: Oct. 30, 2014

(65) Prior Publication Data
US 2015/0121519 A1 Apr. 30, 2015

Related U.S. Application Data

(60) Provisional application No. 61/897,986, filed on Oct. 31, 2013.

(51) Int. Cl.
*G06F 1/26* (2006.01)
*G06F 1/32* (2006.01)
*G06F 21/75* (2013.01)

(52) U.S. Cl.
CPC .......... *G06F 1/26* (2013.01); *G06F 1/324* (2013.01); *G06F 1/329* (2013.01); *G06F 21/755* (2017.08); *Y02D 10/126* (2018.01); *Y02D 10/24* (2018.01)

(58) Field of Classification Search
CPC . G06F 1/26; G06F 1/329; G06F 1/324; G06F 21/558; Y02B 60/144; Y02B 60/1217
See application file for complete search history.

(56) References Cited

U.S. PATENT DOCUMENTS

| | | | |
|---|---|---|---|
| 6,457,135 B1* | 9/2002 | Cooper | G06F 1/14 713/323 |
| 7,802,073 B1* | 9/2010 | Cheng | G06F 9/3851 712/10 |
| 2006/0053475 A1* | 3/2006 | Bezilla | G06F 21/552 726/1 |

(Continued)

*Primary Examiner* — Khoi V Le
(74) *Attorney, Agent, or Firm* — Faegre Baker Daniels LLP

(57) ABSTRACT

The present disclosure relates to a method and system for securing a performance state change of one or more processors. A disclosed method includes detecting a request to change a current performance state of a processor to a target performance state, and adjusting an operating level tolerance range of the current performance state to include operating levels associated with a transition from the current performance state to the target performance state. A disclosed system includes an operating system module operative to transmit a request for a performance state change of at least one processing core. The system includes performance state control logic operative to change the performance state of the at least one processing core based on the request. The system further includes performance state security logic operative to adjust, in response to the request, an operating level tolerance range of the current performance state to include operating levels associated with a transition from the current performance state to the target performance state.

23 Claims, 7 Drawing Sheets

(56) References Cited

U.S. PATENT DOCUMENTS

| | | | | |
|---|---|---|---|---|
| 2006/0174142 A1* | 8/2006 | Lin | .................. | G06F 1/3203 |
| | | | | 713/300 |
| 2007/0283176 A1* | 12/2007 | Tobias | .................. | G06F 1/3203 |
| | | | | 713/322 |
| 2010/0218029 A1* | 8/2010 | Floyd | .................. | G06F 1/3203 |
| | | | | 713/601 |
| 2011/0252251 A1* | 10/2011 | de Cesare | .................. | G06F 1/3203 |
| | | | | 713/320 |
| 2012/0053897 A1* | 3/2012 | Naffziger | .................. | G06F 1/3206 |
| | | | | 702/182 |
| 2012/0079290 A1* | 3/2012 | Kumar | .................. | G06F 1/26 |
| | | | | 713/300 |
| 2013/0111226 A1* | 5/2013 | Ananthakrishnan | ...... | G06F 1/26 |
| | | | | 713/300 |
| 2014/0149769 A1* | 5/2014 | Brock | .................. | G06F 1/3237 |
| | | | | 713/322 |
| 2014/0337646 A1* | 11/2014 | Varma | .................. | G06F 1/3206 |
| | | | | 713/322 |

* cited by examiner

US 10,146,282 B2

1

SYSTEM AND METHOD FOR MONITORING AND CONTROLLING A PERFORMANCE STATE CHANGE

RELATED APPLICATION

This application claims priority to U.S. Provisional Patent Application No. 61/897,986, titled "SYSTEM AND METHOD FOR MONITORING AND CONTROLLING A PERFORMANCE STATE CHANGE," filed Oct. 31, 2013, the entire disclosure of which is expressly incorporated by reference herein.

FIELD OF THE DISCLOSURE

The present disclosure is generally related to processor security, and more particularly to methods and systems for monitoring and controlling a performance state change of at least one processor.

BACKGROUND

A processing node or core in a computing system may be placed in any of multiple performance states (also referred to as power states or operational states) during operation, where the particular performance state (P state) is characterized by an associated operating voltage and operating frequency. Typically, the decision to transition the processing node between performance states is made by the operating system (OS). Other high-level control software or a hardware controller such as a bridge circuit (e.g., northbridge) may also initiate a change in the performance state. One exemplary factor for determining the appropriate performance state of a processing node is the processor's utilization. Utilization is the ratio of the time spent by one or more processing nodes in the active (execution) state to the overall time interval over which the execution time was tracked or measured. A higher node utilization may trigger the selection of a higher operating voltage and/or frequency to better address performance/watt requirements. For example, if the processing node is running at a relatively low performance state resulting in longer code execution time, the system perceives the need for a higher utilization and changes the processing node to a higher performance state suitable for faster code execution. Other suitable factors may cause the system to change performance states, such as the number of chip components running, the number or type of programs running, power saving needs, and/or performance needs, for example.

FIG. 1 illustrates an exemplary known computing system 10 including a computer processor 50. Processor 50, which may include one or more processing devices, includes one or more processing cores (nodes) 16, a bridge circuit 14, memory 19 containing microcode 21, and voltage/clock regulators 20. Memory 13 containing operating system code 15 is accessed by processor 50. In one embodiment, processing cores 16 execute microcode 21 and operating system code 15. In particular, an operating system module 12 includes operating system code 15 executed by at least one processing core 16, and microcode module 18 includes microcode 21 executed by at least one processing core 16. Processor 50 may include a central processing unit (CPU), a graphics processing unit (GPU), an accelerated processing unit (APU), and/or any other suitable processor or processing device. Processor 50 may be a single chip device, such as a system on a chip (SOC), or multiple physical devices. Computing system 10 includes a display 34 operatively coupled to processor 50. An exemplary computing system 10 includes a laptop, desktop, gaming system, mobile device (e.g., tablet, smartphone, etc.), multimedia player, electronic book (e-books), or any other suitable computing system or device.

Microcode module 18 interfaces with operating system module 12 to control aspects of processing cores 16. Microcode module 18 receives instructions or sequences from operating system module 12 and outputs instructions/sequences to bridge circuit 14 for controlling cores 16. For example, microcode module 18 provides signals to bridge circuit 14 for controlling the P state of processing cores 16 based on instructions from operating system module 12. Bridge circuit 14 manages communication between components of computing system 10, including between microcode module 18 and voltage/clock regulators 20. Bridge circuit 14 includes P state control logic 24 for controlling the P state of processing cores 16 based on instructions from microcode module 18.

Operating system module 12 (or P state control logic 24) may determine that a P state of processing cores 16 should change from one level to another based, for example, on usage or utilization of the cores 16. Operating system module 12 generates a P state change request 22 and transmits the request 22 to microcode module 18. Alternatively, operating system module 12 may write request 22 to a register, and microcode module 18 retrieves the request 22 from the register. The P state change request 22 identifies a target performance state, which includes a target operating voltage and a target operating frequency of the cores 16. Microcode module 18 sends the P state change request 22 to bridge circuit 14 for servicing. Microcode module 18 may adjust the request 22, for example, by delaying transmission of the request 22 to bridge circuit 14 or by transmitting the request 22 according to a delivery sequence.

Microcode module 18 writes the request 22 to a storage register 26 of bridge circuit 14 accessible by P state control logic 24. P state control logic 24 issues a voltage and frequency request 30 to regulators 20 (voltage regulator 40 and clock regulator 42, respectively) corresponding to the P state identified with request 22. The voltage and frequency request 30 specifies the target operating voltage and operating frequency of processing cores 16 that was identified in the request 22. Voltage/clock regulators 20 execute the voltage/frequency request 30 by sending corresponding voltage/frequency signals to the respective power rail and clock rail of processing cores 16. In response to the request 22 from microcode module 18, P state control logic 24 may implement the voltage change before or after the frequency change.

If computing system 10 is hacked or otherwise accessed without authorization, the hacker may attempt to cause processor 50 (or subsystems of processor 50) to enter into an improper P state with improper operating voltage and/or frequency levels of processing cores 16. Such improper operating voltages and frequencies may create security vulnerabilities in computing system 10. For example, changes to the operating voltage or frequency of the processing cores 16 may be applied to other voltage planes, pins, or rails coupled to other subsystems of processor 50, including processor memory, for example. As such, if a change in an operating voltage and/or frequency occurs in an undesired manner, there may be a potential that either the processing cores 16 or other subsystems are put in a state that allows the readout of data from registers and memory locations. For example, a hacker may attempt to glitch (e.g., short-term fault) the operating voltage in a predictable way to cause the processor 50 to incorrectly branch or load data, read out proprietary information, or perform other illegal or improper operations.

Therefore, a need exists for methods and systems to provide improved monitoring and secure control during a performance state change of the processor to thereby reduce the likelihood of a security breach. Further, a need exists for methods and systems to improve the detection and blocking of unauthorized access during a performance state change.

SUMMARY OF EMBODIMENTS OF THE DISCLOSURE

In an exemplary embodiment of the present disclosure, a method of securing a performance state change of a processor is provided. The method includes detecting, by performance state security logic, a request to change a current performance state of the processor to a target performance state. The processor has a plurality of performance states each including a target operating level and an operating level tolerance range. The method further includes adjusting, by the performance state security logic in response to the request, the operating level tolerance range of the current performance state of the processor to include operating levels associated with a transition from the current performance state to the target performance state.

Among other advantages in certain embodiments, the method and system of the present disclosure provide improved security over a change of the performance state of one or more processors. In some embodiments, tolerance ranges associated with operating levels of the P state are adjusted during the P state change. In some embodiments, by providing adjustable operating level tolerance ranges during implementation of the P state change, the likelihood of detecting and thwarting a security breach during a P state change is improved. In some embodiments, system security is improved by performing the voltage and frequency changes of a P state change separately as two discrete operations, thereby reducing the time that the voltage level tolerance range is widened for the P state change. Other advantages will be recognized by those of ordinary skill in the art.

In one example, the adjusting comprises expanding the operating level tolerance range of the current performance state to include operating levels ranging from the target operating level of the current performance state to the target operating level of the target performance state. In another example, the adjusting comprises expanding the operating level tolerance range of the current performance state to include operating levels ranging from the target operating level of the current performance state to the target operating level of the target performance state. In yet another example, the adjusting further comprises changing, following the performance state change, the operating level tolerance range of the current performance state to the operating level tolerance range of the target performance state. In still another example, the operating level tolerance range associated with each performance state is defined by an upper bound threshold and a lower bound threshold, and the adjusting comprises changing, prior to the performance state change, one of the upper and lower bound thresholds of the current performance state to one of the upper and lower bound thresholds of the target performance state; and changing, following the performance state change, the other of the upper and lower bound thresholds of the current performance state to the other of the upper and lower bound thresholds of the target performance state. In another example, each performance state comprises an operating voltage and an operating frequency, and the operating voltage has an associated target operating level and an associated operating level tolerance range. In yet another example, the performance state change includes an operating voltage change and an operating frequency change performed prior to or following the operating voltage change. The operating voltage change comprises changing the operating voltage of the current performance state to the operating voltage of the target performance state, and the operating frequency change comprises changing the operating frequency of the current performance state to the operating frequency of the target performance state.

In another exemplary embodiment of the present disclosure, a non-transitory computer-readable medium includes executable instructions such that when executed by at least one processor cause the at least one processor to detect a request to change a current performance state of the at least one processor to a target performance state. The at least one processor has a plurality of performance states each including a target operating level and an operating level tolerance range. The at least one processor, in response to the request, further adjusts the operating level tolerance range of the current performance state of the at least one processor to include operating levels associated with a transition from the current performance state to the target performance state.

In yet another exemplary embodiment of the present disclosure, an integrated circuit is provided including at least one processor having at least one processing core. The at least one processor further includes performance state security logic operative to detect a request to change a current performance state of the at least one processor to a target performance state. The at least one processor has a plurality of performance states each including a target operating level and an operating level tolerance range. In response to the request, the performance state security logic adjusts the operating level tolerance range of the current performance state of the at least one processor to include operating levels associated with a transition from the current performance state to the target performance state.

In still exemplary embodiment of the present disclosure, a computing system is provided including an operating system module, performance state control logic in communication with the operating system module, and performance state security logic. The operating system module is operative to transmit a request to change a current performance state of at least one processing core of the computing system to a target performance state. The at least one processing core includes a plurality of performance states each having a target operating level and an operating level tolerance range. The performance state control logic is operative to change the performance state of the at least one processing core based on the request. The performance state security logic is operative to detect the request to change the current performance state to the target performance state and to adjust, in response to the request, the operating level tolerance range of the current performance state of the at least one processor to include operating levels associated with a transition from the current performance state to the target performance state.

BRIEF DESCRIPTION OF THE DRAWINGS

The embodiments will be more readily understood in view of the following description when accompanied by the below figures and wherein like reference numerals represent like elements.

DETAILED DESCRIPTION

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terminology "circuit" and "circuitry" refers generally to hardwired logic that may be implemented using various discrete components such as, but not limited to, diodes, bipolar junction transistors (BJTs), field effect transistors (FETs), etc., which may be implemented on an integrated circuit using any of various technologies as appropriate, such as, but not limited to CMOS, NMOS, etc.

Figure 1:
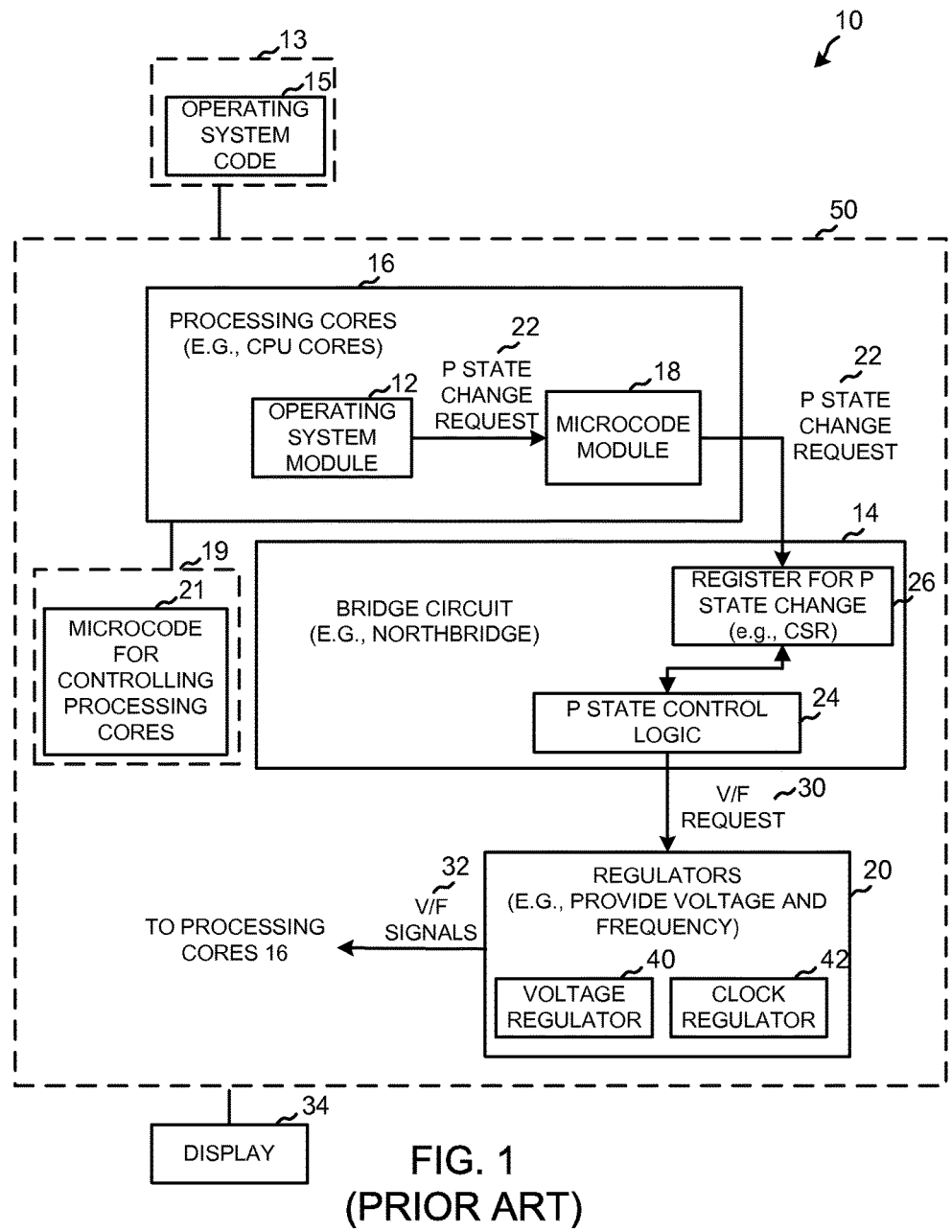
FIG. 1 is a block diagram of a prior known computing system including one or more processing cores and a bridge circuit configured to control the P state of the processing cores.
Figure 2:
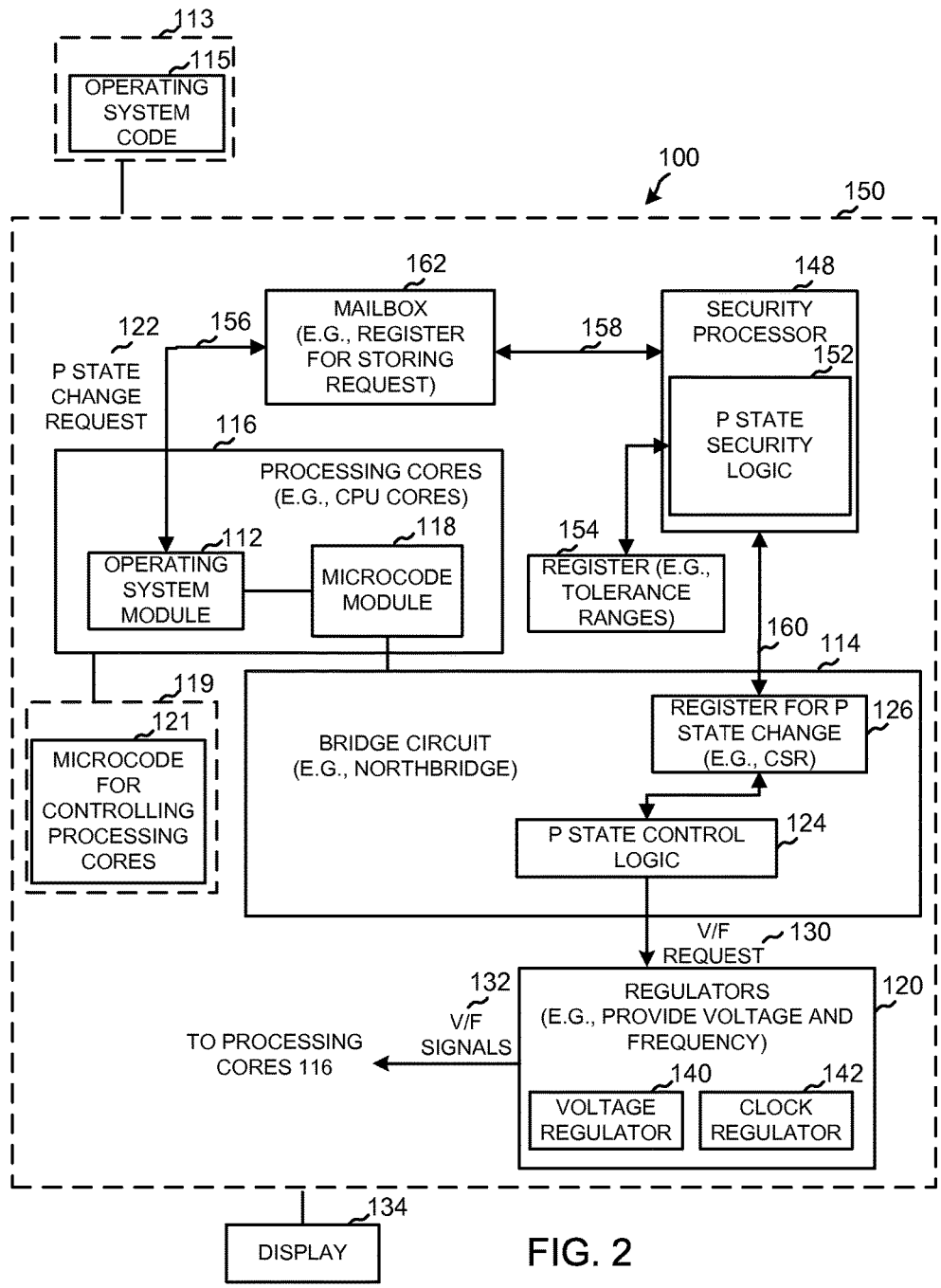
FIG. 2 is a block diagram of a computing system in accordance with some embodiments including a security processor with performance state security logic in communication with a bridge circuit.

FIG. 2 illustrates an exemplary computing system 100 according to various embodiments that is configured to provide improved monitoring and security over the performance state (P state) change of a processor 150. As described herein, computing system 100 is operative to provide adjustable operating level tolerance ranges around the operating voltage and operating frequency during the performance state change. Computing system 100 may be viewed as modifying the known computing system 10 described in FIG. 1. For example, processor 150 of computing system 100 further includes a security processor 148, a mailbox (storage register) 162, and a storage register 154 in communication with security processor 148. Like components of system 10 of FIG. 1 and system 100 of FIG. 2 are provided with like reference numbers (e.g., bridge circuit 14 of FIG. 1 and bridge circuit 114 of FIG. 2, etc.). Various other arrangements of internal and external components and corresponding connectivity of computing system 100, that are alternatives to what is illustrated in the figures, may be utilized and such arrangements of internal and external components and corresponding connectivity would remain in accordance with the embodiments herein disclosed.

In one embodiment, some or all components of processor 150 are provided as an integrated circuit on a single chip device. For example, processor 150 may include a system on a chip (SOC). In one embodiment, processing cores 116, bridge circuit 114, memory 119 containing microcode 121, mailbox (e.g., storage register) 162, security processor 148, and storage register 154 are provided on a single chip device. In the illustrated embodiment, memory 113 containing operating system code 115 is physically separate from and in communication with processor 150, although memory 113 may alternatively be included with processor 150. In one embodiment, the voltage regulator 140 is off-chip, and the clock regulator 142 is on-chip, although both regulators 120 may be provided on-chip. Alternatively, one or more components of processor 150 may be provided on separate physical devices or chips and interfaced with on-chip components via communication paths. In one embodiment, a display 134, which is operative to display data processed at least in part by processing core(s) 116, is externally connected to and in communication with processor 150. In one embodiment, processor 150 includes a central processing unit (CPU), a graphical processing unit (GPU), and/or an accelerated processing unit (APU). Processing cores 116 may be used for any suitable processing tasks, such as general-purpose computations and/or graphical computations (e.g., pixel output for display on display 134), for example. In one embodiment, processing cores 116 are CPU processing cores operative to provide overarching control and command of computing system 100. Other suitable configurations of computing system 100 may be provided.

Memory 113 and memory 119 are illustratively physically separate but may alternatively include portions of the same physical memory. Exemplary memory 113, 119 includes read-only memory (ROM), random access memory (RAM), hard disk storage, flash memory, or other suitable on-chip or off-chip memory types, accessible by processing cores 116. Operating system module 112 includes operating system code 115 (e.g., software and/or firmware) executed by at least one processing core 116 for managing operation of computing system 100. Operating system module 112 is operative, for example, to manage task allocation, memory/processor usage, and hardware resources of computing system 100 and to manage the execution of one or more applications or programs stored in memory of computing system 100. Microcode module 118, which interfaces with operating system module 112 to control at least some functionality of processing cores 116, includes microcode 121 executed by at least one processing core 116.

An exemplary operating system module 112 includes Microsoft Windows, Mac OS, Linux, or other suitable operating systems for managing the overall operation of computing system 100. Operating system module 112 is operative to initiate a P state change request 122 for changing a performance state of one or more subsystems of processor 150, such as processing cores 116, for example. Other suitable control software and/or hardware may initiate the request 122 for the P state change. While the P state change request 122 is described herein as being used to change the P state of one or more processing cores 116, the P state change request 122 may be used to change the P state of other suitable subsystems of processor 150. In the illustrated embodiment, operating system module 112 transmits the request 122 to security processor 148 for implementation, as described herein.

Bridge circuit 114 includes P state control logic 124 for controlling the P state of processing cores 116 based on the P state change request 122. An exemplary bridge circuit 114 is a northbridge circuit, although bridge circuit 114 may include a southbridge circuit or any other suitable circuit for managing on- and/or off-chip communications. In one embodiment, bridge circuit 114 is operative to retrieve data from memory that is used by cores 116 and to provide power requests to regulators 120 for controlling the power at cores 116 and/or other subsystems. A storage register 126 (e.g., a control/status register CSR) is operative to store data accessed or generated by P state control logic 124, such as the P state change request 122.

Security processor 148 may include any suitable processing device(s), such as a general-purpose processor or other suitable processor, for managing processor security. Security processor 148 is illustratively in communication with mailbox 162, storage register 154, and bridge circuit 114 of computing system 100. Security processor 148 includes P state security logic 152 operative to perform P state security and monitoring functions described herein. For example, P state security logic 152, also referred herein to as environmental monitoring and control logic 152, is operative to monitor and provide security controls for the performance state change of processor 150. P state security logic 152 includes software and/or firmware stored in memory executed by security processor 148. Security processor 148 may provide other suitable security related functions for processor 150 and monitor other parameters of computing system 100. Storage register 154 includes any suitable memory for storing the target operating levels and operating level tolerance ranges of the operating voltage and frequency of each predefined performance state.

In the illustrative embodiment of FIG. 2, the P state change request 122 is routed from operating system module 112 to P state security logic 152, and P state security logic 152 manages and monitors the implementation of the request 122 by bridge circuit 114. In this embodiment, microcode module 118 does not route the request 122 from operating system module 112 to bridge circuit 114. In particular, the P state change request 122 from operating system module 112 is routed to mailbox 162 via communication path 156. Mailbox 162 includes one or more storage registers or other suitable memory for storing the P state change requests 122 from operating system module 112. P state security logic 152 is operative to retrieve the P state change requests 122 from mailbox 162 over communication path 158, such as, for example, upon detecting a status flag or bit at mailbox 162 indicating a request 122 has been received. Mailbox 162 may store other suitable data accessed by security processor 148 for controlling processor security. As such, mailbox 162 provides a mailbox message protocol for communication between operating system module 112 and security processor 148. In one embodiment, processor 150 includes logic to block the transmission of P state change requests 122 from microcode module 118 to bridge circuit 114. For additional details of routing P state change requests 122 to bridge circuit 114, see U.S. patent application Ser. No. 13/928,930, filed Jun. 27, 2013, entitled "SYSTEM AND METHOD FOR SECURE CONTROL OVER PERFORMANCE STATE," the entire disclosure of which is incorporated by reference herein.

In an alternative embodiment, microcode module 118 forwards the request from operating system module 112 to register 126 of bridge circuit 114, as described with microcode module 18 of FIG. 1. In this embodiment, bridge circuit 114 notifies P state security logic 152 (e.g., status flag, transmission of notification signal, etc.) that the request 122 has been received such that P state security logic 152 may manage and monitor implementation of the request 122.

In one embodiment, P state control logic 124 accesses the received request 122 in storage register 126 and triggers a P state change based on the request 122. In one embodiment, the request 122 includes separate voltage and frequency requests, as described herein. P state control logic 24 issues a voltage and frequency request 130 to voltage/clock regulators 120 that specifies the target operating voltage and target operating frequency of the P state identified in the request 122. Voltage/clock regulators 120 execute the voltage/frequency request 130 by sending respective voltage/frequency signals to the respective power rail and clock rail of processing cores 116. Voltage regulator 140 receives power from any suitable power source coupled to processor 150, such as battery power or building power, for example. In one embodiment, clock regulator 142 is a digital frequency synthesizer for generating an operating frequency of processing cores 116.

Processor 150 includes a plurality of predefined P states each including an operating voltage and an operating frequency at which processing cores 116 are configured to operate. For example, processor 150 may have eight P states (or any other suitable number) each having a predefined target voltage and a predefined target frequency. The target voltage has an associated operating level tolerance range. In some embodiments, the target frequency also has an associated operating level tolerance range. In the illustrated embodiment, the target voltage, target frequency, and corresponding tolerance ranges are stored in register 154 for access by P state security logic 152.

P state security logic 152 monitors parameters associated with the P state change, such as the operating voltage, operating frequency, chip temperature, and/or other suitable parameters, to detect potential security breaches or faults. In the illustrated embodiment, P state security logic 152 monitors the operating levels of the operating voltage and operating frequency of each P state relative to corresponding operating level tolerance ranges. The tolerance ranges each include an upper bound and a lower bound defining a range of acceptable operating levels for each of the operating voltage and operating frequency of each P state. If the detected operating level of the operating voltage or operating frequency falls outside of the associated tolerance range, P state security logic 152 determines that processor 150 is in an unsecure condition, for example, that the potential exists that operating system module 112 or processor components have been accessed or hacked to change the P state to improper levels. In one embodiment, P state security logic 152 is operative to implement a security function in response to the unsecure condition. Exemplary security functions include stopping the P state change, resetting the processor 150, powering down the processor 150, forcing the processor 150 into an appropriate P state, or any other suitable security function.

During a P state change, P state security logic 152 adjusts the tolerance ranges of the voltage and/or frequency of the current P state to include operating levels between the current P state and the target P state. As such, during a normal transition from the current P state to the target P state, the operating levels of the voltage and/or frequency are configured to fall within the adjusted tolerance ranges until the respective target voltage and target frequency are reached. Accordingly, P state security logic 152 implements and monitors a tolerance range during the P state change while reducing the likelihood of the actual operating levels of the transitioning P state falling outside of the tolerance range during normal processor operation.

As described herein, the operating voltage and operating frequency of each P state may each be associated with a predefined operating level tolerance range. The extent of the tolerance range may depend on various factors, such as the quality of the chip (e.g., silicon quality, etc.). For example, a lesser quality chip may require a greater variance (i.e., a greater tolerance range) because the operating levels may not be as steady or consistent during operation of processor 150. Other suitable factors may affect the extent of the tolerance range. An exemplary variance for the operating voltage is about 5 millivolts (mV), so that an exemplary operating voltage of 0.9 volts (V) has an upper bound of 0.905 V and a lower bound of 0.895 V. An exemplary variance for the operating frequency is about 5-10% of the target operating frequency (e.g., 1600 Hz target operating frequency, with 100 Hz variance). Any other suitable variances may be implemented depending on chip characteristics and design preferences. In one embodiment, the variances are the same for each predefined P state, although different P states may alternatively have different variances.

Figure 3:
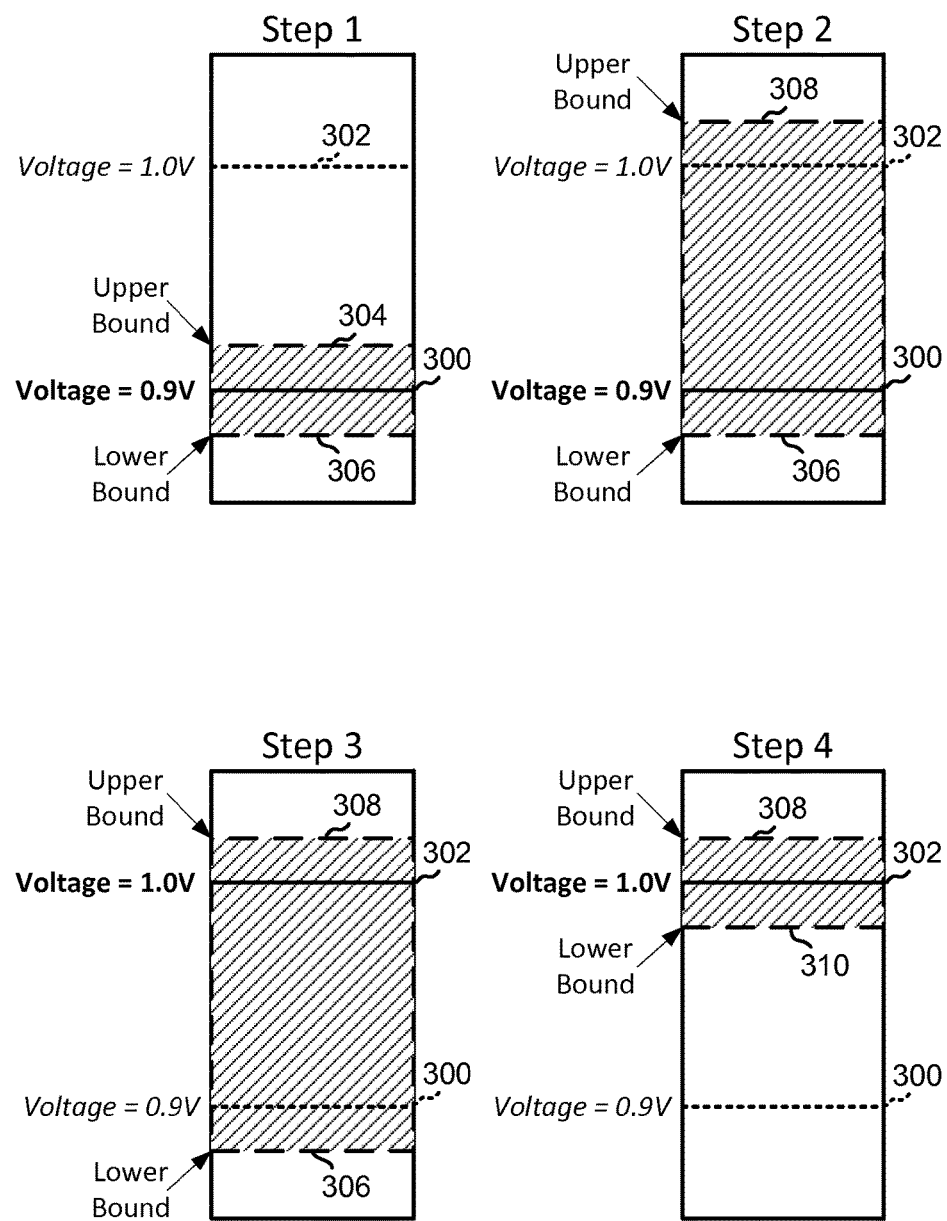
FIG. 3 is a diagrammatical view of an exemplary performance state change according to some embodiments illustrating an adjustment of an operating level tolerance range.

FIG. 3 illustrates an exemplary P state change incorporating an adjustment of the operating level tolerance range by P state security logic 152. While FIG. 3 illustrates a tolerance range adjustment for the operating voltage of a P state change, a frequency tolerance range is adjusted for a frequency change in the same way. Step 1 illustrates the current operating voltage and associated tolerance range of the current P state prior to the P state change. The operating level 300 of the current voltage is illustratively 0.9 V (volts), and the operating level 302 of the target voltage of the target P state is illustratively 1.0 V. The operating level tolerance range of the current voltage is between an upper bound or threshold 304 and a lower bound or threshold 306. In response to a P state change request 122, P state security logic 152 adjusts the upper bound 304 of the voltage of the current performance state to the upper bound 308 of the voltage of the target performance state (Step 2). At Step 3, P state control logic 124 increases the operating voltage to the target operating voltage level 302. The expanded tolerance range between lower bound 306 and upper bound 308 allows the operating voltage to transition to the target level 302 without falling outside the range and triggering a security function. At Step 4 following the voltage change, P state security logic 152 adjusts the lower bound 306 of the voltage of the current performance state to the lower bound 310 of the voltage of the target performance state. As such, the current tolerance range following Step 4 is the tolerance range of the target performance state.

Figure 4:
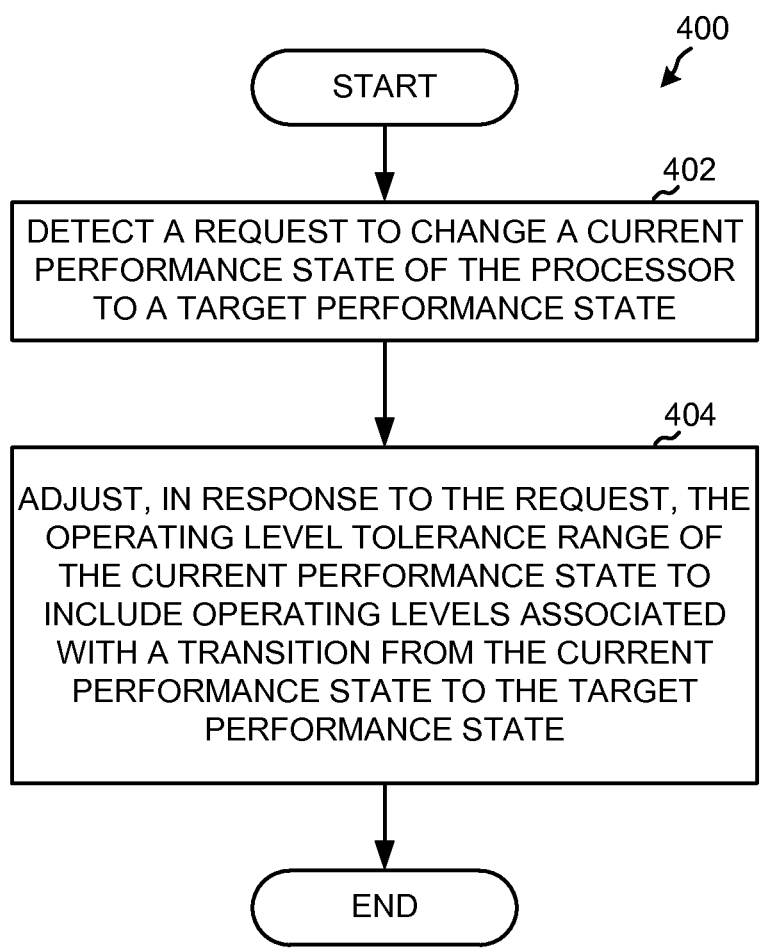
FIG. 4 is a flow chart of an exemplary method of operation of the performance state security logic of FIG. 2 for securing a performance state change, according to some embodiments.

FIG. 4 illustrates a flow diagram 400 of an exemplary operation performed by P state security logic 152 of security processor 148 of FIG. 2 for securing control over a P state change. Reference is made to FIG. 2 throughout the description of FIG. 4. At block 402, P state security logic 152 detects a request 122 to change a current performance state of the processor 150 to a target performance state. In one embodiment, P state security logic 152 detects the request 122 at block 402 by intercepting a transmission of the request 122 from operating system module 112 to bridge circuit 114 of processor 150. For example, the request 122 is routed to P state security logic 152 via mailbox 162, as described herein. Alternatively, P state security logic 152 detects the request 122 at block 402 of FIG. 4 based on a notification from performance state control logic 124 that the performance state control logic received request 122. In this embodiment, the microcode module 118 may transmit the request 122 to bridge circuit 114, and bridge circuit 114 sets a flag to notify P state security logic 152 that the request 122 was received.

At block 304 in response to the request 122, P state security logic 152 adjusts the operating level tolerance range of the current performance state of the processor 150 to include operating levels associated with a transition from the current performance state to the target performance state. The operating level may be the voltage operating level or the frequency operating level. For example, prior to and/or during the P state change, P state security logic 152 expands the operating level tolerance range of the voltage (or frequency) of the current performance state to include operating levels ranging from the target operating level of the current performance state to the target operating level of the target performance state, as described herein with the exemplary voltage change illustrated in Steps 2 and 3 of FIG. 3. P state security logic 152 is further operative to change, following the performance state change, the operating level tolerance range of the voltage (or frequency) of the current performance state to the operating level tolerance range of the target performance state, as described herein in Step 4 of FIG. 3, for example. In the illustrated embodiment, the voltage change and corresponding voltage tolerance range adjustment is performed separately and non-concurrently from (e.g., consecutively) the frequency change.

In one embodiment, P state security logic 152 adjusts the tolerance range by changing, prior to the performance state change, one of the upper and lower bound thresholds of the voltage (or frequency) of the current performance state to one of the upper and lower bound thresholds of the voltage (or frequency) of the target performance state, as described herein. Further, P state security logic 152 changes, following the performance state change, the other of the upper and lower bound thresholds of the voltage (or frequency) of the current performance state to the other of the upper and lower bound thresholds of the target performance state.

In one embodiment, P state security logic 152 sends a confirmation or status signal back to operating system module 112 that the P state change request 122 was either completed or not completed. In one embodiment, P state security logic 152 generates a code or other data indicating the reason for denying or not completing execution of the request 122, such as because the detected actual operating level of the voltage or frequency fell outside the associated tolerance range or because of other security concerns or system constraints. P state security logic 152 may notify operating system module 112 of a potential security breach based on the detection of an unsecure condition.

Figure 5:
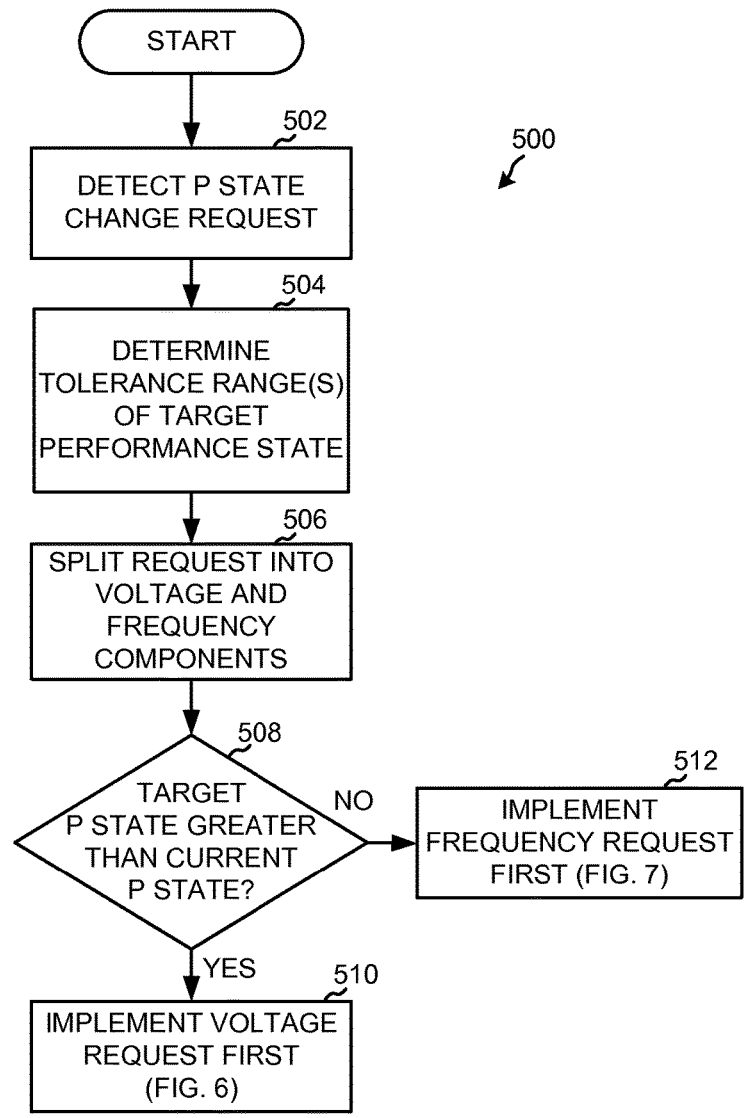
FIG. 5 is a flow chart of an exemplary detailed method of operation of the processor of FIG. 2 for securing a performance state change, according to some embodiments.
Figure 6:
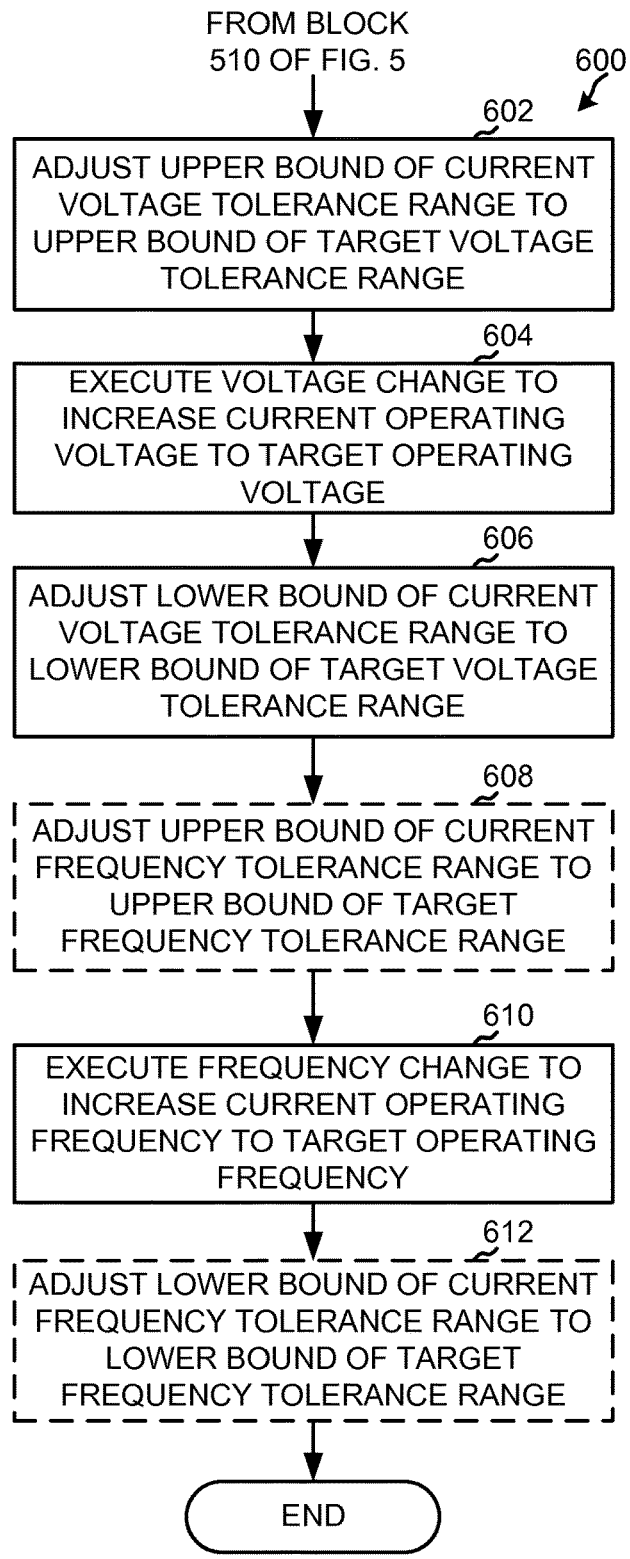
FIG. 6 is a flow chart of an exemplary detailed method of block 510 of FIG. 5 when the target performance state is higher than the current performance state.
Figure 7:
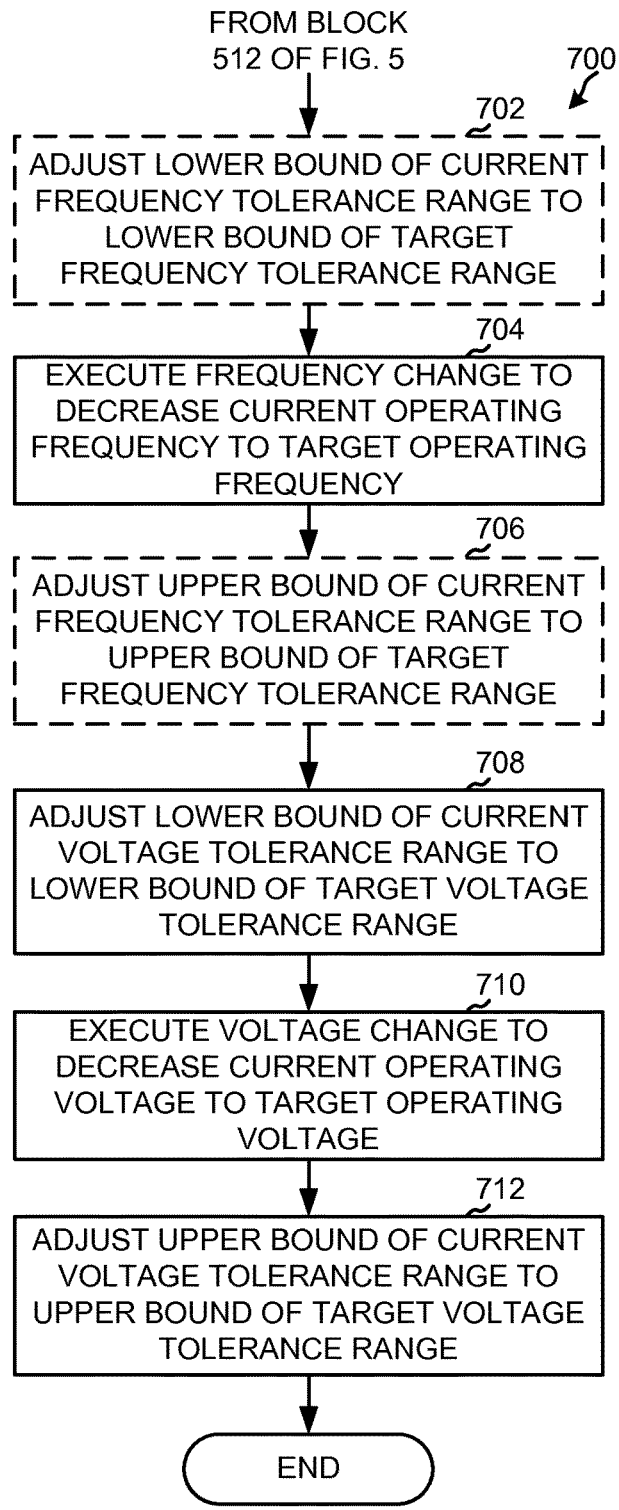
FIG. 7 is a flow chart of an exemplary detailed method of block 512 of FIG. 5 when the target performance state is lower than the current performance state.

FIGS. 5-7 illustrate respective flow diagrams 500, 600, 700 of an exemplary detailed method of operation of processor 150 of FIG. 2 for securing control over a P state change using dynamic tolerance range adjustments. Reference is made to FIG. 2 throughout the description of FIGS. 5-7. At block 502 of FIG. 5, P state security logic 152 detects the P state change request 122. At block 504, P state security logic 152 determines the tolerance range for the operating voltage of the target P state (as well as for the current performance state) by retrieving the tolerance range from register 154. In embodiments where a frequency tolerance range is also implemented, P state security logic 152 also determines the tolerance range for the operating frequency at block 504. P state security logic 152 may also check the target operating levels of the voltage and frequency of the current and target P states.

At block 506, P state security logic 152 splits the request 122 into voltage and frequency components. In one embodiment, P state security logic 152 splits the received request 122 by generating a first request for changing only the voltage or frequency and a second request for changing only the other of the voltage or frequency. The two requests are transmitted to register 126 for separate and non-concurrent (e.g., consecutive) execution by P state control logic 124. For example, the first request identifies either the voltage of the current P state and the frequency of the target P state or the frequency of the current P state and the voltage of the target P state, depending on which of the voltage and frequency is to be changed first by P state control logic 124. The second request identifies both the voltage and frequency of the target P state. As such, only one of the voltage and frequency is changed with the first request, and the other of the voltage and frequency is changed with the second, subsequent request. In one embodiment, the split requests allow P state security logic 152 to implement the corresponding tolerance range adjustment(s) separately with each individual voltage and frequency change. For example, the tolerance range associated with the operating voltage is widened only during the operating voltage change and not during the frequency change, thereby limiting the time that the voltage tolerance range is widened during a P state change.

At block 508, P state security logic 152 determines whether the target P state is greater than the current P state, i.e., whether the operating levels of the voltage/frequency are higher in the target P state than in the current P state. If yes at block 508, P state security logic 152 at block 510 implements the voltage change prior to the frequency change, as described in FIG. 6. If no at block 508, P state security logic 152 at block 512 implements the frequency change prior to the voltage change, as described in FIG. 7. In one embodiment, P state security logic 152 transmits the first and second requests to bridge circuit 114 separately according to which of the voltage and frequency is to be executed first by P state control logic 124. In another embodiment, P state security logic 152 may transmit both requests to P state control logic 124 with instructions to perform the voltage change before or after the frequency change.

P state security logic 152 may alternatively split the request 122 at block 508 based on a notification from P state control logic 124 that P state control logic 124 is prepared to execute a received request 122. For example, after P state security logic 152 (or microcode 118) transmits request 122 to register 126, a checkpoint in P state control logic 124 notifies P state security logic 152 (e.g., via status flag or bit change) that the voltage or frequency change of the request 122 is about to be executed. Based on whether the voltage or frequency is changed first, P state security logic 152 instructs P state control logic 124 to proceed with the change while logic 152 implements the tolerance range adjustment described herein for the corresponding voltage or frequency change. Similarly, after the voltage or frequency is changed by P state control logic 124 and the tolerance range adjusted by P state security logic 152, another checkpoint in P state control logic 124 notifies P state security logic 152 that the other of the voltage change and frequency change is about to be executed. In response, P state security logic 152 instructs P state control logic 124 to proceed with the change while logic 152 implements the corresponding tolerance range adjustment. In the illustrated embodiment, P state security logic 152 continuously monitors, including during the entire P state change, the actual operating levels of both the voltage and frequency and compares them with the corresponding tolerance ranges.

If the target P state has a higher operating level than the current P state at block 508, the method proceeds to flow diagram 600 of FIG. 6 to implement the voltage change and voltage tolerance range adjustments prior to the frequency change (and corresponding frequency tolerance range adjustments if implemented). At block 602, P state security logic 152 adjusts the upper bound of the tolerance range of the current operating voltage to the upper bound of the tolerance range of the target operating voltage, and P state control logic 124 then executes the voltage change to increase the current operating voltage to the target voltage at block 604. At block 606, P state security logic 152 completes the voltage tolerance range adjustment by adjusting the lower bound of the current tolerance range to the lower bound of the tolerance range of the target operating voltage.

With the voltage change and associated tolerance range adjustment completed, the frequency change is implemented. In embodiments where a frequency tolerance range is not applied, the method proceeds to block 610 to execute the frequency change to increase the current operating frequency to the target frequency. Alternatively, frequency tolerance ranges may be implemented, as illustrated with optional blocks 608 and 612. At block 608, P state security logic 152 adjusts the upper bound of the tolerance range of the current operating frequency to the upper bound of the tolerance range of the target operating frequency, and P state control logic 124 then executes the frequency change to increase the current operating frequency to the target frequency at block 610. At block 612, P state security logic 152 completes the frequency tolerance range adjustment by adjusting the lower bound of the current frequency tolerance range to the lower bound of the tolerance range of the target operating frequency. FIG. 3 described herein illustrates an exemplary embodiment of the voltage change (or frequency change) of FIG. 6 when the target P state is higher than the current P state.

If the target P state has a lower operating level than the current P state at block 508 of FIG. 5, the method proceeds to flow diagram 700 of FIG. 7 to implement the frequency change (and the optional frequency tolerance range adjustments) prior to the voltage change and corresponding voltage tolerance range adjustments. At block 702, P state security logic 152 adjusts the lower bound of the tolerance range of the current operating frequency to the lower bound of the tolerance range of the target operating frequency, and P state control logic 124 then executes the frequency change to decrease the current operating frequency to the target frequency at block 704. At block 706, P state security logic 152 completes the frequency tolerance range adjustment by adjusting the upper bound of the current frequency tolerance range to the upper bound of the tolerance range of the target operating frequency. Alternatively, the frequency change may be executed without applying and adjusting a frequency tolerance range, as described with FIG. 6.

With the frequency change (and optional frequency tolerance range adjustment) completed, the voltage change and voltage tolerance range adjustment are implemented. At block 708, P state security logic 152 adjusts the lower bound of the tolerance range of the current operating voltage to the lower bound of the tolerance range of the target operating voltage, and P state control logic 124 then executes the voltage change to decrease the current operating voltage to the target voltage at block 710. At block 712, P state security logic 152 completes the voltage tolerance range adjustment by adjusting the upper bound of the current tolerance range to the upper bound of the tolerance range of the target operating voltage.

In another embodiment, P state security logic 152 may adjust the tolerance ranges incrementally through intermediate P states that are between the current P state and the target P state. For example, if processor 150 includes two predefined P states A and B between the current and target P states (e.g., a P state A of 0.93 V and a P state B of 0.96 V in FIG. 3), P state security logic 152 and control logic 124 may first perform the P state change and tolerance range adjustment from the current P state to the intermediate P state A, followed by a P state change and tolerance range adjustment from the intermediate P state A to the intermediate P state B, followed by a P state change and tolerance range adjustment from the intermediate P state B to the target P state. This "waterfall" approach to the P state change may provide improved security by eliminating a larger tolerance range during the P state change and by providing several smaller tolerance ranges throughout the P state change. In another embodiment, P state security logic 152 may adjust the tolerance range continuously during the transition from the operating level of the current P state to the operating level of the target P state. For example, a same or similar operating level variance may be maintained throughout the P state change to adjust the tolerance range with the P state without substantially increasing the span of the tolerance range.

The disclosed operations set forth herein may be carried out by one or more suitable processors that are in communication with non-transitory computer readable medium such as but not limited to CDROM, RAM, other forms of ROM, hard drives, distributed memory, etc. The non-transitory computer readable medium stores executable instructions that when executed by the one or more processors cause the one or more processors to perform, for example, the operations of P state security logic 152 described herein and/or the methods as described with reference to FIGS. 3-7.

Among other advantages in certain embodiments, the method and system of the present disclosure provide improved security over a change of the performance state of one or more processors. In some embodiments, tolerance ranges associated with operating levels of the P state are adjusted during the P state change. In some embodiments, by providing adjustable operating level tolerance ranges during implementation of the P state change, the likelihood of detecting and thwarting a security breach during a P state change is improved. In some embodiments, system security is improved by performing the voltage and frequency changes of a P state change separately as two discrete operations, thereby reducing the time that the voltage level tolerance range is widened for the P state change. Other advantages will be recognized by those of ordinary skill in the art.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

What is claimed is:

1. A method of securing a performance state change of a processor, the method comprising:
   detecting a request to change a current performance state of the processor to a target performance state, the processor having a plurality of performance states each including a target operating level and an operating level tolerance range;
   adjusting, in response to the request, the operating level tolerance range of the current performance state of the processor to include operating levels associated with a transition from the current performance state to the target performance state,
      wherein the operating level tolerance range associated with each performance state is defined by an upper bound threshold and a lower bound threshold; and
   when the target operating level of the target performance state is greater than the target operating level of the current performance state,
      changing the upper bound threshold of the current performance state to the upper bound threshold of the target performance state prior to increasing the operating level of the current performance state to the target operating level of the target performance state, and
      changing the lower bound threshold of the current performance state to the lower bound threshold of the target performance state following the increasing the operating level of the current performance state to the target operating level of the target performance state.

2. The method of claim 1, wherein the adjusting comprises expanding the operating level tolerance range of the current performance state to include operating levels ranging from the target operating level of the current performance state to the target operating level of the target performance state.

3. The method of claim 1, wherein the operating level tolerance range of the current performance state is adjusted such that the operating level of the current performance state is configured to fall within the operating level tolerance range during the entire transition from the current performance state to the target performance state.

4. The method of claim 1, wherein the adjusting further comprises changing, following the performance state change, the operating level tolerance range of the current performance state to the operating level tolerance range of the target performance state.

5. The method of claim 1, further comprising:
   when the target operating level of the target performance state is less than the target operating level of the current performance state,
      changing the lower bound threshold of the current performance state to the lower bound threshold of the target performance state prior to decreasing the operating level of the current performance state to the target operating level of the target performance state, and
      changing the upper bound threshold of the current performance state to the upper bound threshold of the target performance state following the decreasing the operating level of the current performance state to the target operating level of the target performance state.

6. A method of securing a performance state change of a processor, the method comprising:
   detecting a request to change a current performance state of the processor to a target performance state, the processor having a plurality of performance states each including a target operating level and an operating level tolerance range;

adjusting, in response to the request, the operating level tolerance range of the current performance state of the processor to include operating levels associated with a transition from the current performance state to the target performance state,
wherein the operating level tolerance range associated with each performance state is defined by an upper bound threshold and a lower bound threshold; and
when the target operating level of the target performance state is less than the target operating level of the current performance state,
changing the lower bound threshold of the current performance state to the lower bound threshold of the target performance state prior to decreasing the operating level of the current performance state to the target operating level of the target performance state, and
changing the upper bound threshold of the current performance state to the upper bound threshold of the target performance state following the decreasing the operating level of the current performance state to the target operating level of the target performance state.

7. The method of claim 1, wherein each performance state comprises an operating voltage and an operating frequency, and the operating voltage has an associated target operating level and an associated operating level tolerance range.

8. The method of claim 7, wherein the performance state change includes an operating voltage change and an operating frequency change performed prior to or following the operating voltage change, the operating voltage change comprises changing the operating voltage of the current performance state to the operating voltage of the target performance state, and the operating frequency change comprises changing the operating frequency of the current performance state to the operating frequency of the target performance state.

9. The method of claim 8, wherein the adjusting comprises a tolerance range adjustment performed with the operating voltage change and prior to or following the operating frequency change, the tolerance range adjustment comprising
adjusting the operating level tolerance range associated with the operating voltage of the current performance state to include operating levels associated with a transition to the target operating voltage of the target performance state, and changing, following the operating voltage change, the operating level tolerance range associated with the operating voltage of the current performance state to the operating level tolerance range associated with the operating voltage of the target performance state.

10. The method of claim 1, further comprising monitoring an actual operating level of the current performance state during the transition of the current performance state to the target performance state, and implementing a security function in response to the actual operating level being outside the operating level tolerance range, the security function including at least one of stopping the performance state change, resetting the processor, and powering down the processor.

11. The method of claim 1, wherein the request is detected by intercepting a transmission of the request from an operating system module to a bridge circuit of the processor.

12. The method of claim 1, wherein performance state control logic of the processor is operative to execute the performance state change based on the request, and performance state security logic of the processor detects the request based on a notification from the performance state control logic that the performance state control logic received the request.

13. An integrated circuit comprising:
at least one processor including at least one processing core, the at least one processor further including performance state security logic operative to detect a request to change a current performance state of the at least one processor to a target performance state, the at least one processor having a plurality of performance states each including a target operating level and an operating level tolerance range; and
in response to the request, adjust the operating level tolerance range of the current performance state of the at least one processor to include operating levels associated with a transition from the current performance state to the target performance state,
wherein the operating level tolerance range associated with each performance state is defined by an upper bound threshold and a lower bound threshold; and
when the target operating level of the target performance state is greater than the target operating level of the current performance state, the performance state security logic adjusts the operating level tolerance range by
changing the upper bound threshold of the current performance state to the upper bound threshold of the target performance state prior to increasing the operating level of the current performance state to the target operating level of the target performance state, and
changing the lower bound threshold of the current performance state to the lower bound threshold of the target performance state following the increasing the operating level of the current performance state to the target operating level of the target performance state.

14. The integrated circuit of claim 13, wherein the performance state security logic adjusts the operating level tolerance range by expanding the operating level tolerance range of the current performance state to include operating levels ranging from the target operating level of the current performance state to the target operating level of the target performance state.

15. The integrated circuit of claim 13, wherein the performance state security logic further changes, following the performance state change, the operating level tolerance range of the current performance state to the operating level tolerance range of the target performance state.

16. The integrated circuit of claim 13, wherein each performance state comprises an operating voltage and an operating frequency, the operating voltage has an associated target operating level and an associated operating level tolerance range, and the performance state change includes an operating voltage change and an operating frequency change performed prior to or following the operating voltage change, the operating voltage change comprises changing the operating voltage of the current performance state to the operating voltage of the target performance state, and the operating frequency change comprises changing the operating frequency of the current performance state to the operating frequency of the target performance state.

17. The integrated circuit of claim 16, wherein the performance state security logic adjusts the operating level tolerance range by performing a tolerance range adjustment with the operating voltage change and prior to or following the operating frequency change, the tolerance range adjustment comprising adjusting the operating level tolerance range associated with the operating voltage of the current performance state to include operating levels associated with a transition to the target operating voltage of the target performance state, and changing, following the operating voltage change, the operating level tolerance range associated with the operating voltage of the current performance state to the operating level tolerance range associated with the operating voltage of the target performance state.

18. A computing system comprising:
at least one processor operative to transmit a request to change a current performance state of at least one processing core of the computing system to a target performance state, the at least one processing core including a plurality of performance states each having a target operating level and an operating level tolerance range;
performance state control logic in communication with the at least one processor and operative to change the performance state of the at least one processing core based on the request; and
performance state security logic operative to detect the request to change the current performance state to the target performance state and to adjust, in response to the request, the operating level tolerance range of the current performance state of the at least one processor to include operating levels associated with a transition from the current performance state to the target performance state,
wherein the operating level tolerance range associated with each performance state is defined by an upper bound threshold and a lower bound threshold; and
when the target operating level of the target performance state is greater than the target operating level of the current performance state, the performance state security logic adjusts the operating level tolerance range by,
changing the upper bound threshold of the current performance state to the upper bound threshold of the target performance state prior to increasing the operating level of the current performance state to the target operating level of the target performance state, and
changing the lower bound threshold of the current performance state to the lower bound threshold of the target performance state following the increasing the operating level of the current performance state to the target operating level of the target performance state.

19. The computing system of claim 18, wherein the performance state security logic adjusts the operating level tolerance range by expanding the operating level tolerance range of the current performance state to include operating levels ranging from the target operating level of the current performance state to the target operating level of the target performance state.

20. The computing system of claim 18, wherein the performance state security logic further changes, following the performance state change, the operating level tolerance range of the current performance state to the operating level tolerance range of the target performance state.

21. The computing system of claim 18, wherein each performance state comprises an operating voltage and an operating frequency, the operating voltage has an associated target operating level and an associated operating level tolerance range, and the performance state change includes an operating voltage change and an operating frequency change performed prior to or following the operating voltage change, the operating voltage change comprises changing the operating voltage of the current performance state to the operating voltage of the target performance state, and the operating frequency change comprises changing the operating frequency of the current performance state to the operating frequency of the target performance state.

22. The computing system of claim 21, wherein the performance state security logic adjusts the operating level tolerance range by performing a tolerance range adjustment with the operating voltage change and prior to or following the operating frequency change, the tolerance range adjustment comprising adjusting the operating level tolerance range associated with the operating voltage of the current performance state to include operating levels associated with a transition to the target operating voltage of the target performance state, and changing, following the operating voltage change, the operating level tolerance range associated with the operating voltage of the current performance state to the operating level tolerance range associated with the operating voltage of the target performance state.

23. The computing system of claim 18, further comprising a display device operatively coupled to the at least one processing core and configured to display data processed at least in part by the at least one processing core.

* * * * *